(12) United States Patent
Kaita et al.

(10) Patent No.: US 7,628,125 B2
(45) Date of Patent: Dec. 8, 2009

(54) COOLING SYSTEM

(75) Inventors: Keiji Kaita, Nishikamo-gun (JP); Shinichi Abe, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 763 days.

(21) Appl. No.: 10/584,856

(22) PCT Filed: Jan. 31, 2005

(86) PCT No.: PCT/IB2005/000225

§ 371 (c)(1), (2), (4) Date: Jun. 28, 2006

(87) PCT Pub. No.: WO2005/080765

PCT Pub. Date: Sep. 1, 2005

(65) Prior Publication Data

US 2009/0145375 A1 Jun. 11, 2009

(30) Foreign Application Priority Data

Feb. 13, 2004 (JP) .............................. 2004-036304

(51) Int. Cl.
*F01P 1/06* (2006.01)
*F01P 3/20* (2006.01)
(52) U.S. Cl. ................................. 123/41.31; 123/41.51
(58) Field of Classification Search .............. 123/41.29, 123/41.31, 41.51; 165/39, 41; 180/65.3
See application file for complete search history.

(56) References Cited

U.S. PATENT DOCUMENTS

| 4,436,060 | A |   | 3/1984  | Tanaka et al. |
| 5,251,588 | A | * | 10/1993 | Tsujii et al. ........... 123/142.5 R |
| 2002/0174840 | A1 |   | 11/2002 | Luckner et al. |

FOREIGN PATENT DOCUMENTS

| EP | 0 928 886 A2 | 7/1999 |
| EP | 0 928 886 A3 | 7/1999 |
| JP | 10-252464 A | 9/1998 |
| JP | 10-259721 A | 9/1998 |
| JP | 11-107748 A | 4/1999 |
| JP | 11-280508 A | 10/1999 |
| JP | 2000-073763 A | 3/2000 |
| JP | 2002-276364 | 9/2002 |
| WO | WO 02/079621 A1 | 10/2002 |

\* cited by examiner

*Primary Examiner*—Noah Kamen
(74) *Attorney, Agent, or Firm*—Kenyon & Kenyon LLP (57) ABSTRACT

A cooling system includes a first cooling system in which coolant is supplied from a radiator to a motor so as to cool the motor, and then the coolant is supplied to banks of an engine through a circulation passage and split flow passages so as to cool the engine; and a second cooling system in which the coolant delivered from the radiator through a branch passage is further cooled by a radiator, and the cooled coolant is supplied to a drive circuit so as to cool the drive circuit. With this configuration, it is possible to efficiently cool the motor, the engine, and the drive circuit whose suitable operating temperatures are different from each other, and to make the configuration of the cooling system simple.

12 Claims, 5 Drawing Sheets

COOLING SYSTEM

INCORPORATION BY REFERENCE

This is a 371 national phase application of PCT/IB2005/000225 filed 31 Jan. 2005, claiming priority to Japanese Patent Application No. 2004-036304 filed 13 Feb. 2004. the contents of which are incorporated herein by reference.

FIELD OF THE INVENTION

The invention relates to a cooling system, and more particularly to a cooling system used in a hybrid system which includes an internal combustion engine, a drive mechanism including a motor, and a drive circuit for driving the motor.

BACKGROUND OF THE INVENTION

Japanese Patent Laid-Open Publication No. 2002-2763 64 (JP-A-2002-276364) discloses an example of such a cooling system in which coolant is supplied from an engine cooling system to a motor through a branch passage so as to cool the motor. In this cooling system, a branch portion from which the branch passage extends is provided downstream of a radiator in the engine cooling system such that the coolant is delivered to the motor through the branch passage. After the coolant is further cooled using a radiator for the motor, the coolant is delivered to the motor, and the motor is cooled by the coolant. Then, the coolant is returned to the engine cooling system at a portion downstream of the branch portion. Thus, the engine and the motor are efficiently cooled.

Ordinarily, in a hybrid system including an internal combustion engine and a motor, it is necessary to cool the internal combustion engine, the motor, and a drive circuit for driving the motor (for example, an inverter circuit). A suitable operating temperature range of the internal combustion engine, a suitable operating temperature range of the motor, and a suitable operating temperature range of the drive circuit are different from each other. Accordingly, it is desired to efficiently cool such plural heating elements so that a temperature of each of the heating elements is in the suitable operating temperature range thereof.

DISCLOSURE OF THE INVENTION

It is an object of the invention to provide a cooling system which can efficiently cool plural heating elements so that a temperature of each of the heating elements is in a suitable operating temperature range thereof. It is another object of the invention to provide a cooling system having a simple configuration.

A first aspect of the invention relates to a cooling system used in a hybrid system which includes an internal combustion engine, a drive mechanism including a motor, and a drive circuit for driving the motor. The cooling system includes a first cooling system which includes a first cooling device for cooling a cooling medium, and in which the cooling medium that has been cooled by the first cooling device is delivered to the drive mechanism, and then to the internal combustion engine, and is returned to the first cooling device so that the drive mechanism and the internal combustion engine are cooled; and a second cooling system which includes a second cooling device for cooling the cooling medium, and in which part of the cooling medium delivered from the first cooling device is cooled by the second cooling device, and the cooled cooling medium is returned to the first cooling system through the drive circuit so that the drive circuit is cooled.

In the first cooling system of the cooling system according to the first aspect of the invention, the drive mechanism including the motor whose suitable operating temperature is lower than that of the internal combustion engine is provided upstream of the internal combustion engine, and the cooling medium is circulated, whereby the drive mechanism and the internal combustion engine can be efficiently cooled. Also, in the second cooling system of the cooling system, the cooling medium delivered from the first cooling device of the first cooling system is cooled by the second cooling device, and the drive circuit for driving the motor is cooled using the cooling medium cooled by the second cooling device. Therefore, the drive circuit whose suitable operating temperature is lower than that of the drive mechanism and that of the internal combustion engine can be efficiently cooled. Further, since the cooling medium delivered from the first cooling device is cooled by the second cooling device, size of the second cooling device can be made small. Thus, the three heating elements can be efficiently cooled using the two cooling systems, and the configuration of the cooling system can be made simple.

The second cooling system may be a cooling system in which after the cooling medium cools the drive circuit, the cooling medium is returned to a portion downstream of the drive mechanism in the first cooling system. With this configuration, the internal combustion engine can be cooled using the cooling medium that has been returned from the second cooling system.

The second cooling system may further include flow rate adjusting means for adjusting a flow rate of the cooling medium. With this configuration, it is possible to appropriately adjust the flow rate of the cooling medium flowing in the second cooling system. As a result, the drive circuit can be efficiently cooled.

The internal combustion engine may be an engine which includes plural operation systems each of which includes at least one cylinder, and in which each of the plural operation systems can be separately operated; and the first cooling system may be a cooling system in which a flow of the cooling medium is split such that the cooling medium is separately delivered to each of the plural operation systems of the internal combustion engine, and each of the plural operation systems is separately cooled. With this configuration, each of the operation systems of the internal combustion engine can be separately cooled.

In the cooling system used in the hybrid system including the internal combustion engine in which each of the operation systems can be separately operated, the first cooling system may further include plural pressure-delivery means each of which delivers, under pressure, the cooling medium to a corresponding operation system among the plural operation systems. With this configuration, the cooling medium is separately delivered under pressure to each of the operation systems.

In the cooling system which includes the plural pressure-delivery means, the first cooling system may further include pressure-delivery control means for controlling driving of the plural pressure-delivery means based on an operating state of the internal combustion engine. In this case, the pressure-delivery control means may control driving of the plural pressure-delivery means such that the cooling medium is delivered under pressure only to an operation system that is being operated among the plural operation systems. With this configuration, since the cooling medium can be delivered under pressure only to the operation system that needs to be cooled, energy efficiency can be improved. Also, in a case where at least one of the plural operation systems is being operated, and an operation system that has not been operated starts to be operated, the pressure-delivery control means may control driving of the pressure-delivery means for delivering, under pressure, the cooling medium to the operation system that will start to be operated such that the cooling medium flows back to the operation system that will start to be operated for a predetermined time period before the operation system starts to be operated. With this configuration, it is possible to promptly perform warming-up of the operation system that will start to be operated.

In the cooling system used in the hybrid system including the internal combustion engine in which each of the operation systems can be separately operated, the first cooling device may be a cooling device which can separately cool the cooling medium that has been delivered from each of the plural operation systems of the internal combustion engine. In this case, the first cooling device may include an inlet portion which separately receives the cooling medium that has been delivered from each of the plural operation systems of the internal combustion engine; a cooling portion which separately cools the cooling medium that has been delivered from each of the plural operation systems; and an outlet portion from which the cooling medium that has been delivered from each of the plural operation systems and has been separately cooled is discharged. With this configuration, it is possible to separately cool the cooling medium that has been delivered from each of the operation systems more reliably.

The first cooling device and the second cooling device may cool the cooling medium using heat exchange with outside air. Also, the hybrid system may be a hybrid vehicle which can run using power supplied from the internal combustion engine and power supplied from the motor, and each of the first cooling device and the second cooling device may include a radiator.

A second aspect of the invention relates to a cooling system used in a system including an internal combustion engine which includes plural operation systems each of which includes at least one cylinder, and in which each of the plural operation systems can be separately operated. The cooling system includes a cooling device which cools a cooling medium; split flow supply means for splitting a flow of the cooling medium that has been cooled by the cooling device, and separately supplies the cooling medium to each of the plural operation systems of the internal combustion engine; and return means for returning, to the cooling device, the cooling medium that has cooled each of the plural operation systems of the internal combustion engine.

In this cooling system, the flow of the cooling medium that has been cooled by the cooling device is split, and the cooling medium is separately supplied to each of the plural operation systems of the internal combustion engine, whereby each of the plural operation systems can be separately cooled. In this cooling system, the cooling device may be a cooling device which cools the cooling medium using heat exchange with the outside air, such as a radiator.

Further, the split flow supply means may further include plural pressure-delivery means each of which delivers, under pressure, the cooling medium to a corresponding operation system among the plural operation systems of the internal combustion engine. With this configuration, the cooling medium can be separately delivered under pressure to each of the operation systems.

The cooling system including the plural pressure-delivery means may further include pressure-delivery control means for controlling driving of the plural pressure-delivery means based on an operating state of the internal combustion engine. In this case, the pressure-delivery control means may control driving of the plural pressure-delivery means such that the cooling medium is delivered under pressure only to an operation system that is being operated among the plural operation systems. With this configuration, since the cooling medium can be delivered under pressure only to the operation system that needs to be cooled, energy efficiency can be improved. Also, in a case where at least one of the plural operation systems is being operated, and an operation system that has not been operated starts to be operated, the pressure-delivery control means may control driving of the pressure-delivery means corresponding to the operation system that will start to be operated such that the cooling medium flows back to the operation system that will start to be operated for a predetermined time period before the operation system starts to be operated. With this configuration, it is possible to promptly perform warming-up of the operation system that will start to be operated.

The cooling device may be a cooling device which can separately cool the cooling medium that has been delivered from each of the plural operation systems of the internal combustion engine. In this case, the first cooling device may include an inlet portion which separately receives the cooling medium that has been delivered from each of the plural operation systems of the internal combustion engine; a cooling portion which separately cools the cooling medium that has been delivered from each of the plural operation systems; and an outlet portion from which the cooling medium that has been delivered from each of the plural operation systems and has been separately cooled is discharged. With this configuration, it is possible to separately cool the cooling medium that has been delivered from each of the operation systems more reliably.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
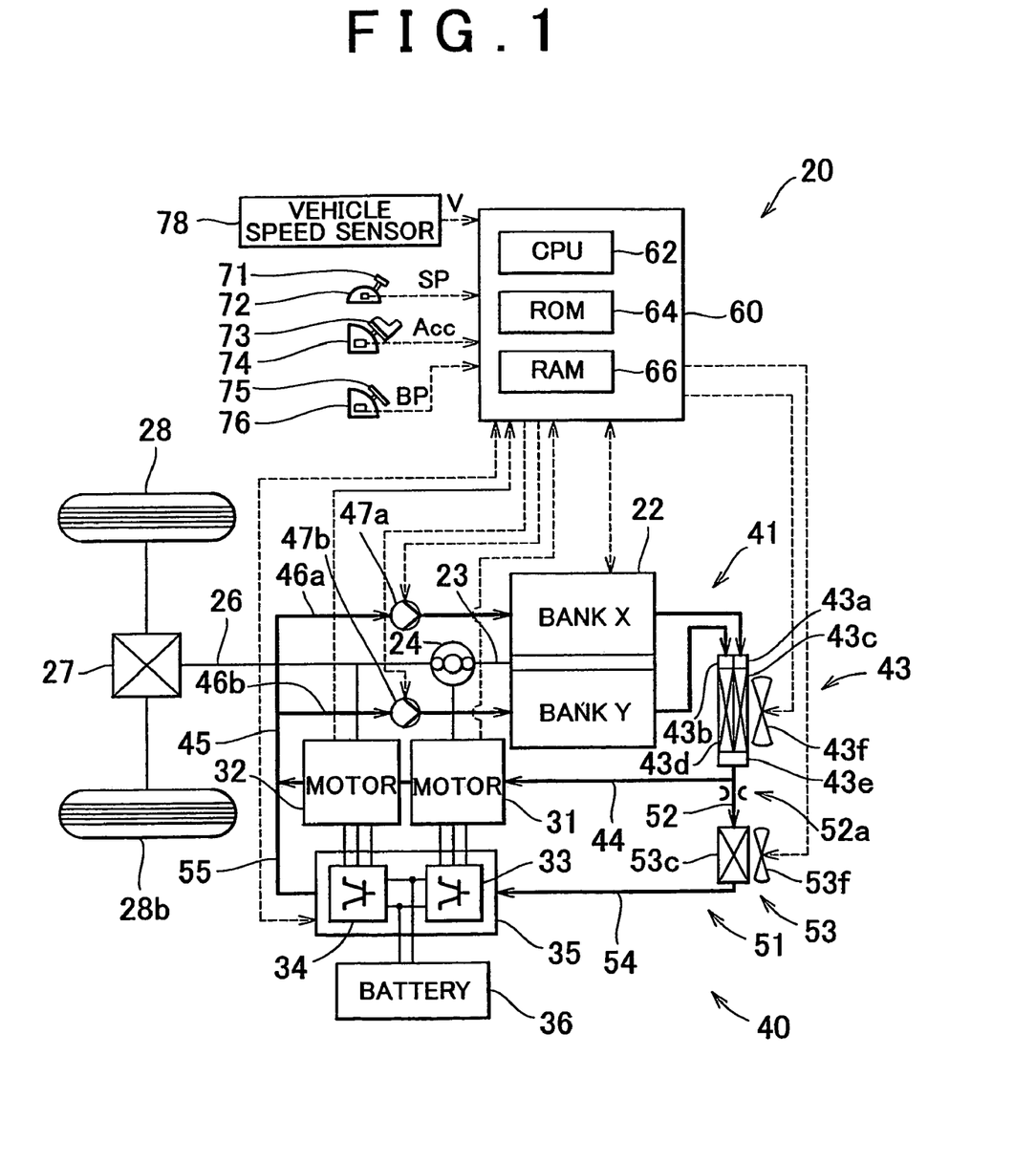
FIG. 1 is a schematic diagram showing a configuration of a hybrid vehicle 20 including a cooling system 40 according to an embodiment of the invention.

FIG. 1 is a schematic diagram showing a configuration of a hybrid vehicle 20 including a cooling system 40 according to an embodiment of the invention. As shown in FIG. 1, in the embodiment, the hybrid vehicle 20 includes a V-6 engine 22, a planetary gear 24, a motor 31, a motor 32, a drive circuit 35, a battery 36, a cooling system 40, and an electronic control unit 60. The V-6 engine 22 includes a bank X and a bank Y. Each of the bank X and the bank Y includes three cylinders. The bank X and the bank Y can be separately operated. A carrier of the planetary gear 24 is connected to a crank shaft 23 of the engine 22. A ring gear of the planetary gear 24 is connected to a drive shaft 26 which is connected to drive wheels 28a and 28b through a differential gear 27. A rotation shaft of the motor 31 is fitted to a sun gear of the planetary gear 24. A rotation shaft of the motor 32 is fitted to the drive shaft 26. The drive circuit 35 includes inverters 33 and 34 for driving the motors 31 and 32. The battery 36 supplies electric power to the motors 31 and 32, and receives electric power from the motors 31 and 32 through the drive circuit 35. The cooling system 40 cools the engine 22, the motors 31 and 32, and the drive circuit 35. The electronic control unit 60 controls the entire hybrid vehicle 20.

The cooling system 40 includes a first cooling system 41 for cooling the engine 22 and the motors 31 and 32, and a second cooling system 51 for cooling the drive circuit 35. In the first cooling system 41, after coolant is cooled by a radiator 43 using heat exchange with outside air, the coolant is supplied to the motors 31 and 32 through a circulation passage 44, and the motors 31 and 32 are cooled. Then, the coolant flows into split flow passages 46a and 46b via a circulation passage 45, and the coolant is supplied to each of the banks X and Y of the engine 22 so that the engine 22 is cooled. Then, the coolant is returned to the radiator 43 from the banks X and Y of the engine 22. In the first cooling system 41, the coolant is circulated under pressure by a first pump 47a and a second pump 47b that are provided in the split flow passages 46a and 46b, respectively. The motors 31 and 32 are cooled before the engine 22 is cooled because a suitable operating temperature of the motors 31 and 32 is lower than a suitable operating temperature of the engine 22. The radiator 43 includes inflow tanks 43a and 43b, heat exchangers 43c and 43d, an outflow tank 43e, and a fan 43f. The inflow tank 43a receives the coolant delivered from the bank X of the engine 22. The inflow tank 43b receives the coolant delivered from the bank Y of the engine 22. The coolant in the inflow tank 43a is delivered to the heat exchanger 43c, and is cooled by the heat exchanger 43c using the outside air. The coolant in the inflow tank 43b is delivered to the heat exchanger 43d, and is cooled by the heat exchanger 43d using the outside air. The coolant is delivered from the heat exchangers 43c and 43d to the outflow tank 43e. Both of the coolant delivered from the heat exchanger 43c and the coolant delivered from the heat exchanger 43d are discharged from the outflow tank 43e to the circulation passage 44. The fan 43f sends the outside air to the heat exchangers 43c and 43d. Accordingly, by controlling driving of the first pump 47a and the second pump 47b, each of the banks X and Y of the engine 22 can be separately cooled.

In the second cooling system 51, the coolant is delivered to a radiator 53 from the radiator 43 through a branch passage 52 extending from the circulation passage 44, and the radiator 53 further cools the coolant using the outside air. After the coolant is further cooled, the coolant is supplied to the drive circuit 35 through a supply passage 54 so as to cool the drive circuit 35. Then, the coolant is returned to the circulation passage 45 of the first cooling system 41 from the drive circuit 35 through a return passage 55. An orifice 52a is provided in the branch passage 52 in the vicinity of a branch portion from which the branch passage 52 extends. The orifice 52a adjust a flow rate of the coolant supplied to the radiator 53. The radiator 53 includes a heat exchanger 53c and a fan 53f. The heat exchanger 53c cools the coolant using the outside air. The fan 53f sends the outside air to the heat exchanger 53c. Thus, since the coolant delivered from the radiator 43 is further cooled by the radiator 53, the drive circuit 35 whose suitable operating temperature is low can be efficiently cooled.

The electronic control unit 60 is configured as a microcomputer which mainly includes a CPU 62. The electronic control unit 60 includes a ROM 64 for storing process programs, a RAM 66 for temporarily storing data, and input/output ports (not shown), in addition to the CPU 62. The electronic control unit 60 receives, through the input port, detection signals from various sensors for detecting an operating state of the engine 22, signals from rotational position detection sensors (not shown) for detecting rotational positions of rotors of the motors 31 and 32, phase current from an electric current sensor (not shown) fitted to an electric power line extending from the inverters 33 and 34 of the drive circuit 35 to the motors 31 and 32, a signal indicative of a shift position SP from a shift position sensor 72 for detecting an operation position of a shift lever 71, a signal indicative of an accelerator angle Acc from an accelerator position sensor 74 for detecting a depression amount of an accelerator pedal 73, a signal indicative of a brake pedal position BP from a brake pedal position sensor 76 for detecting a depression amount of a brake pedal 75, a signal indicative of a vehicle speed V from a vehicle speed sensor 78, and the like. Also, the electronic control unit 60 outputs, through the output port, drive signals for various actuators (not shown) for controlling the engine 22, switching control signals for the inverters 33 and 34 of the drive circuit 35, drive signals for the fans 43f and 53f, drive signals for the first pomp 47a and the second pump 47b, and the like.

In the aforementioned cooling system 40 according to the embodiment, which is installed in the hybrid vehicle 20, since the engine 22 is cooled after the motors 31 and 32 whose suitable operating temperature is lower than that of the engine 22 are cooled in the first cooling system 41, the motors 31 and 32, and the engine 22 can be efficiently cooled. Further, since each of the banks X and Y of the engine 22 can be separately cooled, the engine 22 can be cooled as required. Also, in the second cooling system 51, the coolant that is cooled by the radiator 43 of the first cooling system 41 is further cooled by the radiator 53, and then the drive circuit 35 is cooled by the coolant. Therefore, the drive circuit 35 whose suitable operating temperature is low can be efficiently cooled. Further, after cooling the drive circuit 35, the coolant is returned to the portion downstream of the motors 31 and 32. Therefore, the coolant can be used for cooling the engine 22. Thus, since the cooling system 40 includes the first cooling system 41 and the second cooling system 51, it is possible to efficiently cool plural heating elements having different operating temperatures (the motors 31 and 32, the engine 22, and the drive circuit 35), and to make the configuration of the cooling system simple.

In the cooling system 40 according to the embodiment, which is installed in the hybrid vehicle 20, the orifice 52a is provided in the branch passage 52 so as to adjust the flow rate of the coolant flowing in the second cooling system 51. However, a flow rate adjusting valve for adjusting the flow rate may be fitted, instead of the orifice 52a.

Figure 2:
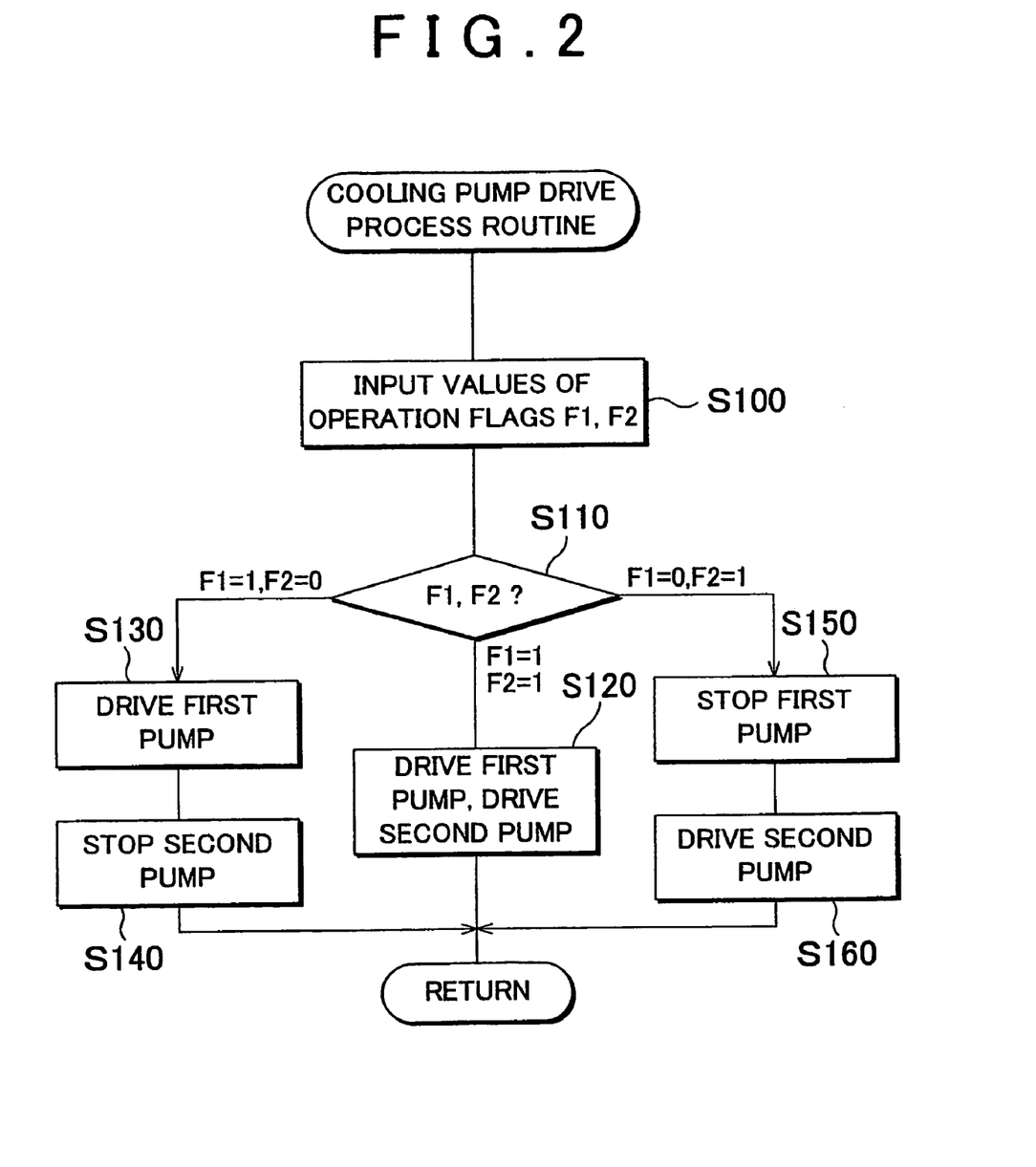
FIG. 2 is a flowchart showing an example of a cooling pump drive process routine performed by an electronic control unit 60 while an engine 22 is being operated.

Next, description will be made of operation of the cooling system 40 according to the embodiment which is thus configured and is installed in the hybrid vehicle 20. More specifically, description will be made of operation of the cooling system 40 while the engine 22 is being operated, and operation of the cooling system 40 when the engine 22 is started. First, description will be made of the operation of the cooling system 40 while the engine 22 is being operated. FIG. 2 is a flowchart showing an example of a cooling pump drive process routine performed by the electronic control unit 60 while the engine 22 is being operated. This routine is repeatedly performed at predetermined time intervals (for example, every one second) while the engine 22 is being operated.

When the cooling pump drive process routine is performed, first, values of operation flags F1 and F2 are input (step S100). The operation flags F1 and F2 indicate operating states of the banks. X and Y of the engine 22, respectively. Then, the values of the operation flags F1 and F2 are determined (step S110). The values of the operation flags F1 and F2 are set by an operation control routine (not shown) for controlling operation of the engine 22. When each of the banks X and Y is being operated, each of the operation flags F1 and F2 is set to 1. When each of the banks X and Y is not being operated, each of the operations flags F1 and F2 is set to 0.

When both of the operation flags F1 and F2 are set to 1, that is, when both of the bank X and the bank Y of the engine 22 are being operated, it is determined that both of the bank X and the bank Y need to be cooled. Accordingly, the first pump 47a and the second pump 47b are driven (step S120), and then the routine is terminated. Thus, both of the bank X and the bank Y can be cooled. When the operation flag F1 is set to 1 and the operation flag F2 is set to 0, that is, when the bank X of the engine 22 is being operated, and operation of the bank Y is being stopped, it is determined that the bank X needs to be cooled, and the bank Y does not need to be cooled. Accordingly, the first pump 47a is driven (step S130), and operation of the second pump 47b is stopped (step S140). Then, the routine is terminated. Thus, since the coolant is not supplied to the bank Y which is not being operated, it is possible to reduce consumption of electric power by an amount of electric power required for driving the second pump 47b. Further, when the operation flag F1 is set to 0 and the operation flag F2 is set to 1, that is, when operation of the bank X of the engine 22 is being stopped and the bank Y is being operated, it is determined that the bank X does not need to be cooled and the bank Y needs to be cooled. Accordingly, the operation of the first pump 47a is stopped (step S150), and the second pump 47b is driven (step S160). Then, the routine is terminated. Thus, since the coolant is not supplied to the bank X which is not being operated, it is possible to reduce consumption of electric power by an amount of electric power required for driving the first pump 47a.

According to the cooling pump drive process routine that has been described, each of the first pump 47a and the second pump 47b can be driven based on the operating state of the engine 22. As a result, it is possible to reduce consumption of electric power. Accordingly, it is possible to improve energy efficiency of the entire vehicle.

Figure 3:
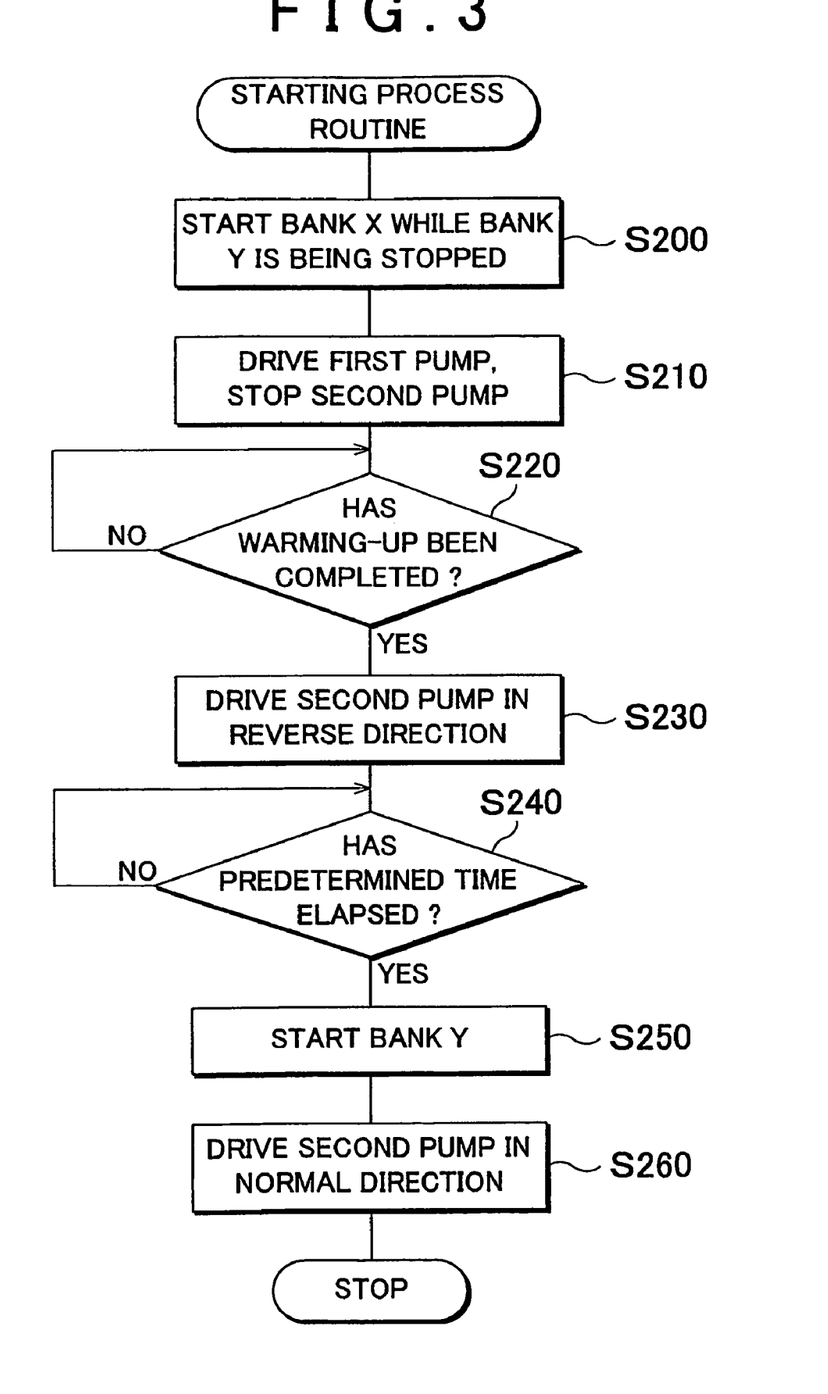
FIG. 3 is a flowchart showing an example of a starting process routine performed by the electronic control unit 60 when the engine 22 is started.
Figure 4:
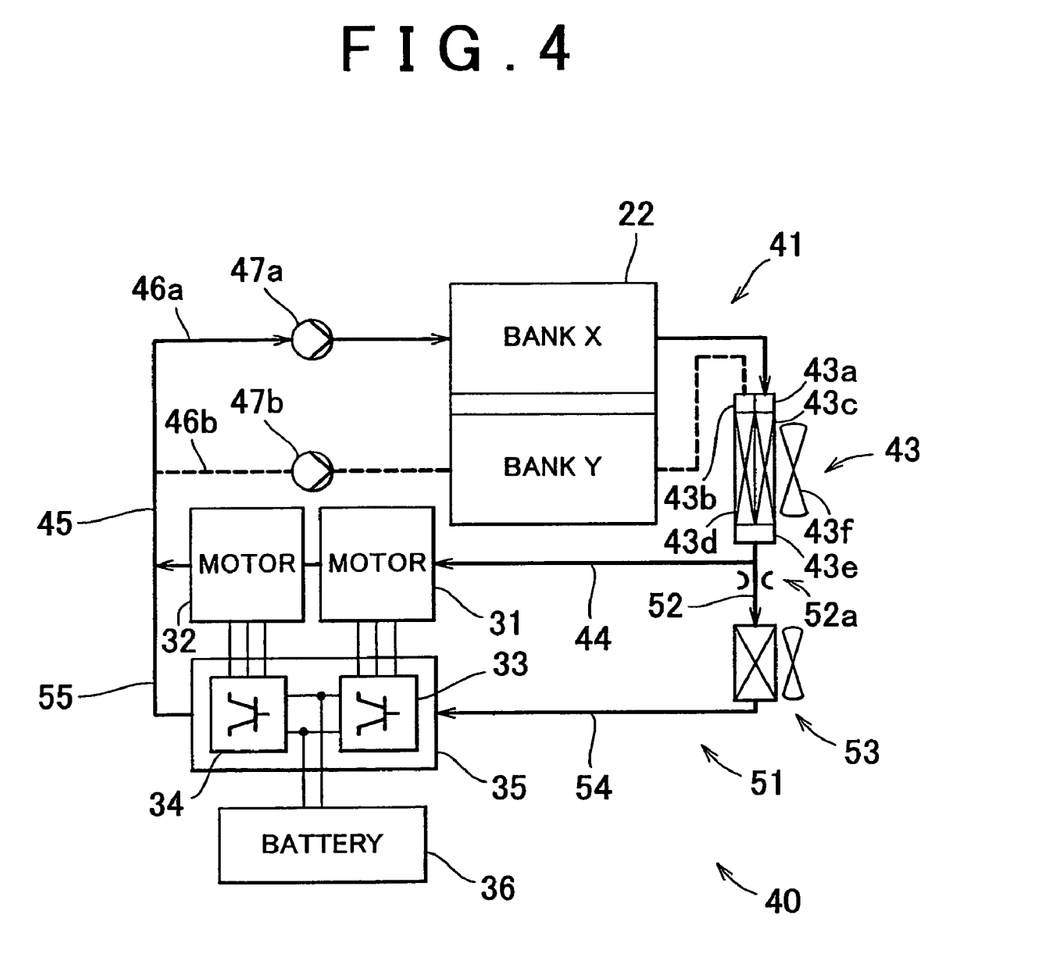
FIG. 4 is a diagram showing a state of the cooling system 40 when a bank X of the engine 22 starts to be operated and warming-up of the bank X is performed.

Next, description will be made of the operation of the cooling system 40 when the engine 22 is started, and starting operation of the engine 22. FIG. 3 is a flowchart showing an example of a starting process routine performed by the electronic control unit 60 when the engine 22 is started. When an instruction for starting the engine 22 is issued and the starting process routine is performed, first, the CPU 62 of the electronic control unit 60 starts the operation of the bank X of the engine 22 while the operation of the bank Y is being stopped (step S200), and drives the first pump 47a of the cooling system 40 while the operation of the second pump 47b is being stopped (step S210) until warming-up of the bank X is completed (step S220). As described above, since the engine 22 is configured such that each bank can be separately operated. Therefore, when the engine 22 is started, only one bank starts to be operated and warming-up of the bank is performed. FIG. 4 shows the state of the cooling system 40 at this time. As shown in FIG. 4, in the first cooling system 41, since the operation of the second pump 47b is being stopped, the coolant is delivered from the radiator 43 to the motors 31 and 32 and the bank X of the engine 22, and then the coolant is returned to the radiator 43. Since the coolant is circulated in this manner, a time required for warming-up can be reduced by a time required for warming the volume of the coolant for the bank Y. Thus, warming-up of the bank X can be completed promptly.

Figure 5:
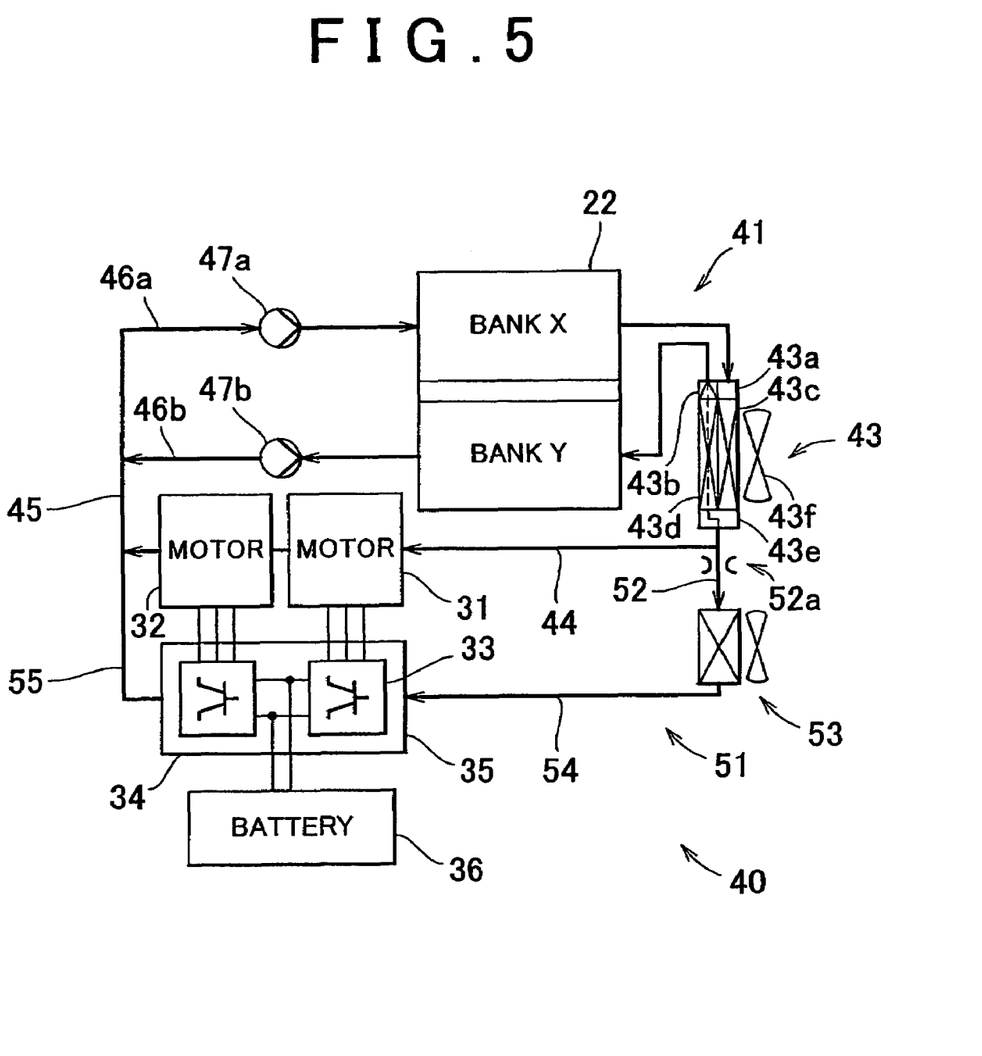
FIG. 5 is a diagram showing a state of the cooling system 40 when a bank Y of the engine 22 is preheated.

After warming-up of the bank X is completed, the second pump 47b is driven so as to be rotated in a reverse direction (step S230) until a predetermined time period elapses (step S240). FIG. 5 shows the state of the cooling system 40 at this time. As shown in FIG. 5, in the first cooling system 41, since the second pump 47b is rotated in the reverse direction, the coolant which has cooled the bank X and has reached the radiator 43 is returned to the bank Y side from the outflow tank 43e of the radiator 43, and the bank Y is preheated. After the bank Y is preheated for a predetermined time, the bank Y starts to be operated through fuel injection control and ignition control for the bank Y (step S250). Then, the second pump 47b is driven so as to be rotated in a normal direction (step S260), after which the routine is terminated.

According to the starting process routine that has been described, when the engine 22 is started, first, only the bank X starts to be operated and the coolant is circulated. Therefore, the time required for warming-up can be reduced by the time required for warming the volume of the coolant for the bank Y. Thus, warming-up of the bank X can be completed promptly. Then, before the bank Y starts to be operated, the second pump 47b is driven to be rotated in the reverse direction and the coolant is caused to flow back into the bank Y, whereby the bank Y is preheated. Therefore, warming-up of the bank Y can be completed promptly.

According to the starting process routine in the embodiment, when the engine 22 is started, first, the bank X starts to be operated and warming-up of the bank X is performed. Then, the bank Y starts to be operated. However, first, the bank Y may start to be operated and warming-up of the bank Y may be performed, and then the bank X may start to be operated. Also, the bank X and the bank Y may start to be operated simultaneously.

In the cooling system 40 according to the embodiment, which is installed in the hybrid vehicle 20, when the engine 22 is started, the second pump 47b is driven to be rotated in the reverse direction, and the coolant which has cooled the bank X and has reached the radiator 43 is returned to the bank Y side from the outflow tank 43e of the radiator 43, whereby the bank Y is preheated. However, the coolant which has cooled the bank X may be supplied directly to the bank Y so as to preheat the bank Y, instead of being supplied to the bank Y through the radiator 43. In this case, a communication passage for connecting a coolant outlet of the bank X to a coolant outlet of the bank Y is provided, and an opening/closing valve for opening/closing the communication passage is provided.

In the hybrid vehicle 20 including the cooling system 40 according to the embodiment, an engine 22 in which two banks, that are, the bank X and the bank Y can be separately operated is mounted. However, an engine in which three or more banks can be separately operated may be mounted.

Since the cooling system 40 according to the embodiment includes the first cooling system 41 and the second cooling system 51, and efficiently cools plural heating elements (the motors 31 and 32, the engine 22, and the drive circuit 35), the engine 22 in which the bank X and the bank Y can be separately operated does not necessarily need to be mounted in the hybrid vehicle 20. An engine in which a bank X and a bank Y cannot be separately operated may be mounted. Also, an engine which does not include any bank may be mounted.

The cooling structure 40 according to the embodiment is installed in the hybrid vehicle 20 which includes the engine 22, the planetary gear 24 which is connected to the crank shaft 23 and the drive shaft 26 of the engine 22, the motor 31 which is fitted to the sun gear of the planetary gear 24, and the motor 32 which is fitted to the drive shaft 26. However, since the cooling system 40 according to the embodiment includes the first cooling system 41 and the second cooling system 51, and efficiently cools plural heating elements (the motors 31 and 32, the engine 22, and the drive circuit 35), the hybrid vehicle in which the cooling system 40 is installed may have any configuration as long as the hybrid vehicle includes an engine, a motor, and a drive circuit for driving the motor.

As long as the cooling system 40 according to the embodiment efficiently cools an engine in which plural banks can be separately operated, or efficiently performs warming-up or preheating of an engine, the cooling system 40 does not necessarily need to efficiently cool plural heating elements (the motors 31 and 32, the engine 22, and the drive circuit 35). That is, the cooling system 40 may be configured as a system which cools only an engine in which plural banks can be separately operated. In this case, a vehicle in which the cooling system 40 according to the embodiment is installed does not need to include the motors 31 and 32, and the drive circuit 35 for driving the motors 31 and 32.

While the invention has been described with reference to exemplary embodiments thereof, is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

The invention claimed is:

1. A cooling system used in a hybrid system which includes an internal combustion engine, a drive mechanism including a motor, and a drive circuit for driving the motor, comprising:
   a first cooling system which includes a first cooling device for cooling a cooling medium, and in which the cooling medium that has been cooled by the first cooling device is delivered to the drive mechanism, and then to the internal combustion engine, and is returned to the first cooling device so that the drive mechanism and the internal combustion engine are cooled; and
   a second cooling system which includes a second cooling device for cooling the cooling medium, and in which part of the cooling medium delivered from the first cooling device is cooled by the second cooling device, and the cooling medium cooled by the second cooling device is returned to the first cooling system through the drive circuit so that the drive circuit is cooled.

2. The cooling system according to claim 1, wherein in the second cooling system, after the cooling medium cools the drive circuit, the cooling medium is returned to a portion downstream of the drive mechanism in the first cooling system.

3. The cooling system according to claim 1, wherein the second cooling system further includes a flow rate adjusting portion for adjusting a flow rate of the cooling medium.

4. The cooling system according to claim 1, wherein the internal combustion engine includes plural operation systems each of which includes at least one cylinder, and each of the plural operation systems can be separately operated; and in the first cooling system, a flow of the cooling medium is split such that the cooling medium is separately delivered to each of the plural operation systems of the internal combustion engine, and each of the plural operation systems is separately cooled.

5. The cooling system according to claim 4, wherein the first cooling system further includes plural pressure-delivery portions each of which delivers, under pressure, the cooling medium to a corresponding operation system among the plural operation systems.

6. The cooling system according to claim 5, wherein the first cooling system further includes a pressure-delivery control portion for controlling driving of the plural pressure-delivery portions based on an operating state of the internal combustion engine.

7. The cooling system according to claim 6, wherein the pressure-delivery control portion controls driving of the plural pressure-delivery portions such that the cooling medium is delivered under pressure only to an operation system that is being operated among the plural operation systems.

8. The cooling system according to claim 6, wherein in a case where at least one of the plural operation systems is being operated, and an operation system that has not been operated starts to be operated, the pressure-delivery control portion controls driving of the pressure-delivery portions for delivering, under pressure, the cooling medium to the operation system that will start to be operated such that the cooling medium flows back to the operation system that will start to be operated for a predetermined time period before the operation system starts to be operated.

9. The cooling system according to claim 4, wherein the first cooling device can separately cool the cooling medium that has been delivered from each of the plural operation systems of the internal combustion engine.

10. The cooling system according to claim 9, wherein the first cooling device includes an inlet portion which separately receives the cooling medium that has been delivered from each of the plural operation systems of the internal combustion engine; a cooling portion which separately cools the cooling medium that has been delivered from each of the plural operation systems; and an outlet portion from which the cooling medium that has been delivered from each of the plural operation systems and has been separately cooled is discharged.

11. The cooling system according to claim 1, wherein the first cooling device and the second cooling device cool the cooling medium using heat exchange with outside air.

12. The cooling system according to claim 1, wherein the hybrid system is a hybrid vehicle which can run using power supplied from the internal combustion engine and power supplied from the motor, and each of the first cooling device and the second cooling device includes a radiator.

* * * * *

UNITED STATES PATENT AND TRADEMARK OFFICE
CERTIFICATE OF CORRECTION

PATENT NO. : 7,628,125 B2
APPLICATION NO. : 10/584856
DATED : December 8, 2009
INVENTOR(S) : Kaita et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 833 days.

Signed and Sealed this

Second Day of November, 2010

David J. Kappos
*Director of the United States Patent and Trademark Office*